(12) United States Patent
Zhang (10) Patent No.: US 6,888,993 B2
(45) Date of Patent: May 3, 2005

(54) DISPERSION COMPENSATING OPTICAL FIBER FOR SMF AND TRANSMISSION LINK INCLUDING SAME

(75) Inventor: Lu Zhang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 150 days.

(21) Appl. No.: 10/306,370

(22) Filed: Nov. 27, 2002

(65) Prior Publication Data

US 2004/0101263 A1 May 27, 2004

(51) Int. Cl.$^7$ ............................. G02B 6/22; G02B 6/18
(52) U.S. Cl. .................................. 385/127; 385/124
(58) Field of Search .................................. 385/123–128

(56) References Cited

U.S. PATENT DOCUMENTS

| | | | |
|---|---|---|---|
| 5,568,583 A | 10/1996 | Akasaka et al. | 385/123 |
| 5,740,297 A | 4/1998 | Onishi | 385/127 |
| 6,757,468 B2 * | 6/2004 | Bickham et al. | 385/127 |
| 6,807,351 B2 * | 10/2004 | Hebgen et al. | 385/127 |
| 2002/0067903 A1 | 6/2002 | Fleury et al. | 385/123 |
| 2003/0053780 A1 | 3/2003 | Zhang | 385/127 |
| 2003/0063875 A1 | 4/2003 | Bickham et al. | 385/98 |
| 2003/0174987 A1 | 9/2003 | Bickham et al. | 385/127 |

FOREIGN PATENT DOCUMENTS

| | | | |
|---|---|---|---|
| WO | WO00/67053 | 11/2000 | G02B/6/16 |
| WO | WO 200067053 A1 * | 11/2000 | C03B/37/018 |
| WO | WO02/21172 | 3/2002 | G02B/6/00 |

OTHER PUBLICATIONS

Pending U.S. Appl. No. 10/184,377, filed Jun. 28, 2002 in the United States Patent and Trademark Office, entitled "Dispersion and Slope Compensating Optical Fiber and–Transmission Link Including Same".

V. Srikant et al., "Optimized Dispersion Compensating Fiber for C– and L–Band 10 GBIT/S WDS Systems Over Standard SMF" 1999 Annual Multiplexed Telephony Conference, vol. 2, Jul. 18–22, 1999, pp. 25–30.

* cited by examiner

Primary Examiner—Akm Enayet Ullah
Assistant Examiner—Omar Rojas
(74) Attorney, Agent, or Firm—Randall S. Wayland (57) ABSTRACT

A DCF for compensating for the accumulated dispersion of a length of SMF in the C+L band window that includes a core surrounded by a cladding layer of refractive index $\Delta_c$. The core includes at least three radially adjacent segments; a central core segment having a positive $\Delta 1$, a moat segment having a negative refractive index $\Delta 2$, and a ring segment having a positive refractive index $\Delta 3$, wherein $\Delta 1 > \Delta 3 > \Delta c > \Delta 2$. The DCF exhibits a negative dispersion slope of between –0.29 and –0.43 ps/nm$^2$/km at 1575 nm, and a total dispersion less than –96 and greater than –108 ps/nm/km at 1575 nm. A transmission link including the combination of a SMF and the present invention DCF is also disclosed.

15 Claims, 6 Drawing Sheets

DISPERSION COMPENSATING OPTICAL FIBER FOR SMF AND TRANSMISSION LINK INCLUDING SAME

BACKGROUND OF THE INVENTION

1. Field of the Invention

The present invention relates to optical fibers and transmission links for wavelength division multiplexing (WDM) systems, and more particularly to dispersion compensating optical fibers and transmission links including such fibers that have negative dispersions within an operating window and are particularly well suited for compensating dispersion of single mode fibers.

2. Technical Background

Figure 2:
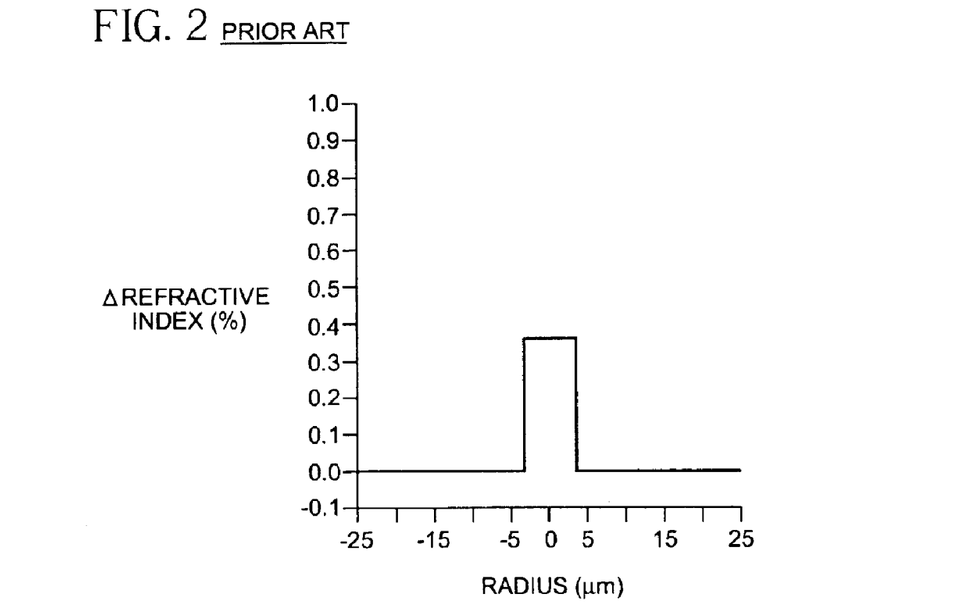
FIG. 2 illustrates a refractive index profile of a SMF in accordance with the Prior Art.

To meet the ongoing drive for more bandwidth at lower costs, telecommunications system designers are turning to high channel count dense wavelength division multiplexing (DWDM) architectures, longer reach systems and higher transmission bit rates. This evolution makes chromatic dispersion management critical to system performance, as system designers now desire the ability to accurately compensate dispersion across entire channel plans. Today, the only viable broadband commercial technology to battle dispersion has been Dispersion Compensating Modules (DCMs), i.e., spools having a suitable length of Dispersion Compensating Fiber (DCF) wound thereon. As DWDM deployments increase to 16, 32, 40 and more channels, broadband dispersion compensating products are even more desirable. Many current telecommunications systems have Single Mode Fibers (SMFs) that, although they are optimized for zero dispersion at about 1310 nm, can also be utilized effectively to transmit signals at wavelengths around 1550 nm. This enables erbium-doped fiber amplifiers to be employed. An example of such a SMF is SMF-28® manufactured by Corning Incorporated. Prior Art FIG. 2 illustrates the refractive index profile for such a SMF. Typically, such fibers are referred to as standard single mode fibers or step index single mode fibers and exhibit a dispersion of about 17 ps/nm/km and a dispersion slope of about 0.058 ps/nm$^2$/km at 1550 nm.

With continuing interest in higher bit rate systems (>10 Gbs), broadband, long reach systems (e.g., >500 km) and optical networking, it is imperative to use DCFs in networks that carry data on SMF as well. High bit rates, longer reaches and wider bandwidths require dispersion to be compensated for more exactly.

Consequently, it is desirable for the DCF to have dispersion characteristics such that its dispersion is matched to that of the SMF transmission fiber it is required to compensate at the wavelength window of interest. The ratio of dispersion to dispersion slope at a given wavelength is referred to as "kappa ($\kappa$)." Kappa changes as a function of wavelength for a given transmission fiber. Hence, it is equally important that the kappa value of the DCF is closely matched to that of the transmission fiber in the operating window.

It would be desirable to develop alternative DCFs, in particular, ones having the ability to compensate for dispersion of SMF over a wide wavelength band around 1575 nm, and in particular over the C and L bands (from about 1525 to 1625 nm).

SUMMARY OF THE INVENTION

The present invention is a dispersion compensating optical fiber which preferably exhibits negative dispersion and negative dispersion slope at 1575 nm and which is designed to compensate for dispersion of a SMF over the C+L operating wavelength bands thereby providing broadband dispersion compensation.

The dispersion compensating fiber in accordance with the present invention comprises a refractive index profile with a central core segment having a positive relative refractive index $\Delta 1$, a moat segment surrounding the central core segment having negative relative refractive index $\Delta 2$, and a ring segment which surrounds the moat segment having a positive relative refractive index $\Delta 3$, wherein $\Delta 1 > \Delta 3 > \Delta 2$, and where $\Delta$ is defined as:

$$\Delta(\%) = \frac{(n_i^2 - n_c^2)}{2n_c^2} \cdot 100,$$

where $n_c$ is the refractive index of the cladding, and $n_i$ is the refractive index of the segment of interest.

The dispersion compensating fiber in accordance with a first embodiment of the invention preferably exhibits a refractive index profile that results in a negative dispersion slope of less than −0.29 and greater than −0.43 ps/nm$^2$/km at a wavelength of 1575 nm; more preferably less than −0.32 and greater than −0.39 ps/nm$^2$/km km at a wavelength of 1575 nm, a negative dispersion of less than −96 and greater than −109 ps/nm/km at a wavelength of 1575 nm; more preferably less than −102 and greater than −108 ps/nm/km at a wavelength of 1575 nm. The kappa value, defined as the dispersion at 1575 nm divided by the dispersion slope at 1575 nm, is preferably in the range between of 272 to 332 nm; more preferably between 285 and 315 nm. The dispersion compensating fiber preferably has a cladding layer surrounding the ring segment having a relative refractive index $\Delta c$, wherein $\Delta 1 > \Delta 3 > \Delta c > \Delta 2$.

In accordance with further embodiments of the invention, the dispersion compensating fiber exhibits a refractive index profile that results in a dispersion slope of less than −0.32 and greater than −0.39 ps/nm$^2$/km at a wavelength of 1575 nm, and a negative dispersion of between −102 and −108 ps/nm/km at a wavelength of 1575 nm.

Advantageously, the theoretical cutoff wavelength ($\lambda_c$) of the dispersion compensating fiber is preferably less than 1700 nm.

In accordance with embodiments of the dispersion compensating fiber of the present invention, the peak delta $\Delta 1$ of the central core segment is greater than 1.7% and less than 2.0%. The lowest delta $\Delta 2$ of the moat segment is less than −0.2% and greater than −0.6%. The peak delta $\Delta 3$ of the ring segment is greater than 0.2% and less than 0.5%.

In accordance with embodiments of the invention, the dispersion compensating optical fiber has an outer radius $r_1$ of the central core segment between 1.7 and 2.0 microns; an outer radius $r_2$ of the moat segment between 3.5 and 4.5 microns; and a center radius $r_3$ of the ring segment between 5.0 and 8.0 microns.

The dispersion compensating fiber preferably exhibits a pin array bend loss that is less than 20 dB at 1575 nm. Low bend loss is important in DCF's as it allows for compact packaging in the dispersion compensating module and helps to keep the total link attenuation low.

In accordance with other embodiments of the invention, an optical fiber transmission link is provided comprising a length of SMF having a dispersion zero in a wavelength range of between about 1290 nm to 1320 nm and having a dispersion at 1575 nm of between about 13 and 21 ps/nm/km; and a length of dispersion compensating fiber as described herein having a dispersion value between −96 and −108 at 1575 nm optically coupled to the SMF wherein within a transmission band of between 1525 nm to 1625 nm the transmission link exhibits a high-to-low residual dispersion less than about 0.3 ps/km/nm. Preferably, the length of SMF is greater than 5 times the length of the length of dispersion compensating fiber.

Additional features and advantages of the invention will be set forth in the detailed description which follows, and will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
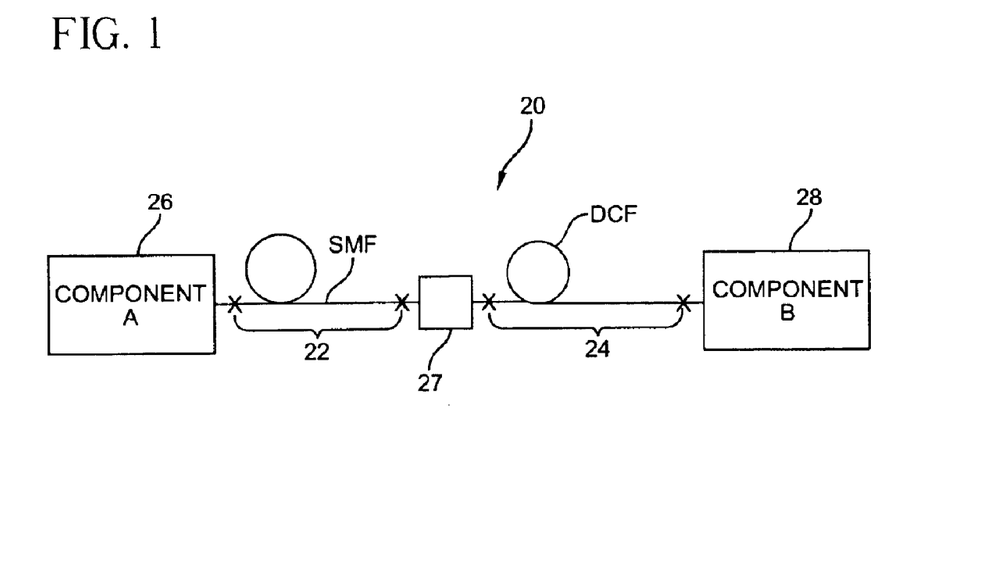
FIG. 1 illustrates a transmission link including the dispersion compensating fiber in accordance with the invention.

Reference will now be made in detail to the present preferred embodiments of the invention, an example of which is illustrated in the accompanying drawings. Wherever possible, the same reference numbers will be used throughout the drawings to refer to the same or like parts. Drawings should not be construed to be to scale. An exemplary embodiment of a transmission link including the dispersion compensating fiber in accordance with the present invention is shown in FIG. 1.

The transmission link 20 includes a length of SMF 22 being substantially single moded in operation at 1575 nm and having a positive dispersion of between about 13 and 21 ps/nm/km, nominally about 18 ps/nm/km, and positive dispersion slope of between about 0.04 and 0.07 ps/nm$^2$/km at 1575 nm, nominally about 0.057 ps/nm$^2$/km at 1575 nm. The SMF preferably has a kappa at 1575 nm of about 318 nm. Preferably, the SMF 22 exhibits a step index shape as shown in FIG. 2, for example and has a zero dispersion wavelength at between about 1290 and 1320 nm. The link 20 also includes a length of dispersion compensating fiber 24 in accordance with the invention which has a geometry and core refractive index profile as shown in any of the exemplary embodiments of FIGS. 4–6, respectively.

Figure 3:
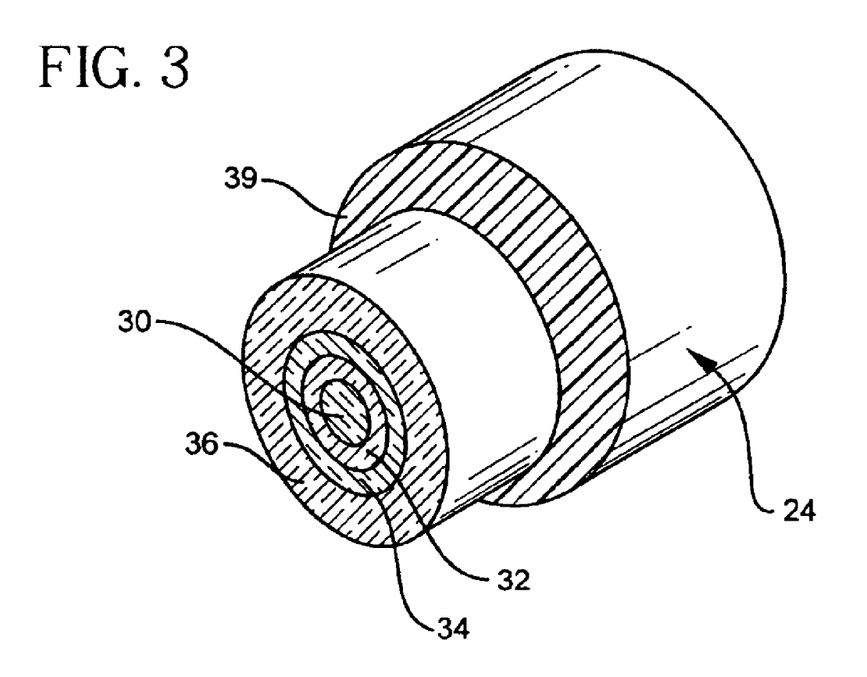
FIG. 3 illustrates a sectioned perspective view of the dispersion compensating fiber in accordance with the invention.
Figure 4:
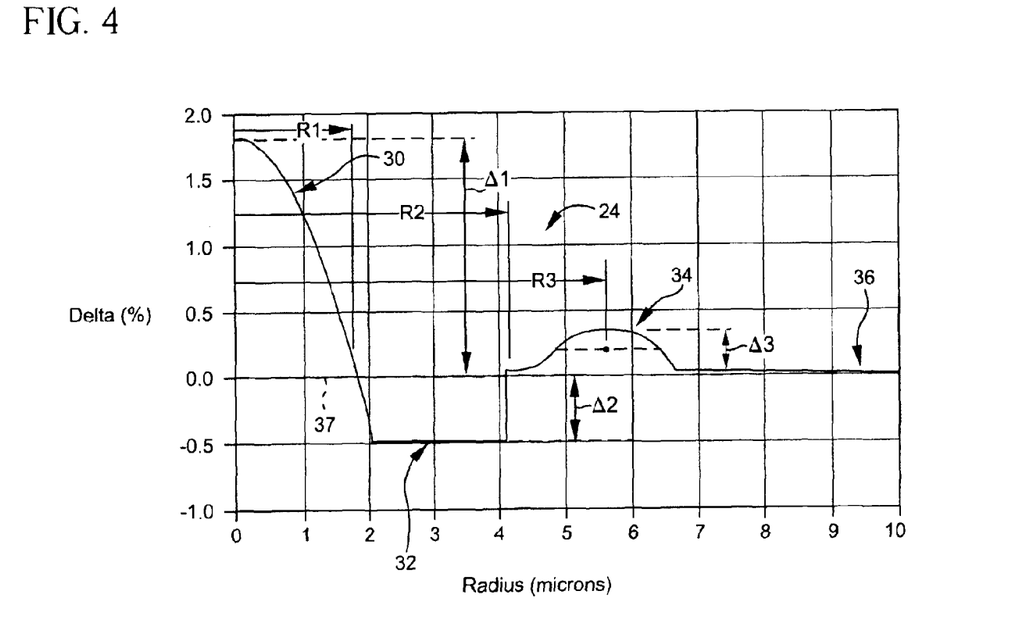
FIG. 4 illustrates a refractive index profile of a dispersion compensating fiber in accordance with the present invention.

As shown in FIG. 3 the dispersion compensating fiber 24 has a central cylindrical core segment 30 extending along the center of the fiber, the central core segment having a positive relative refractive index $\Delta 1$ (see FIG. 4); an annular moat segment 32 surrounding and abutting the central core segment 30 that has a negative relative refractive index $\Delta 2$ (FIG. 4); and an annular ring segment 34 abutting and surrounding the moat segment 32 having a positive relative refractive index $\Delta 3$ (FIG. 4). In particular, the shape of the refractive index profile of the dispersion compensating fiber is such that $\Delta 1 > \Delta 3 > \Delta 2$ as best shown in the exemplary embodiments of FIGS. 4–6.

Figure 5:
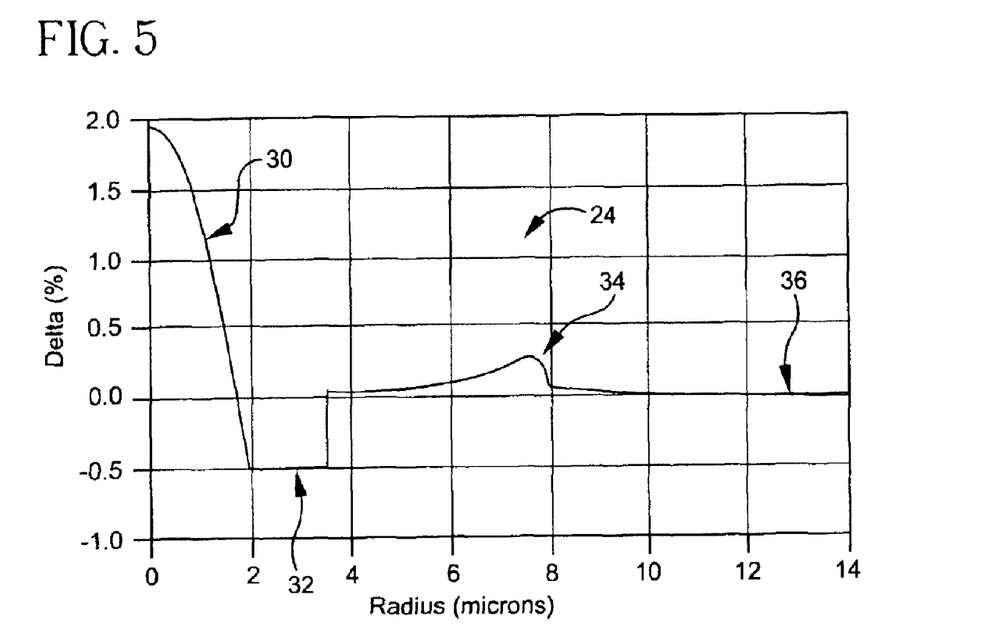
FIGS. 5 and 6 illustrate refractive index profiles of other embodiments of dispersion compensating fiber in accordance with the present invention.
Figure 6:
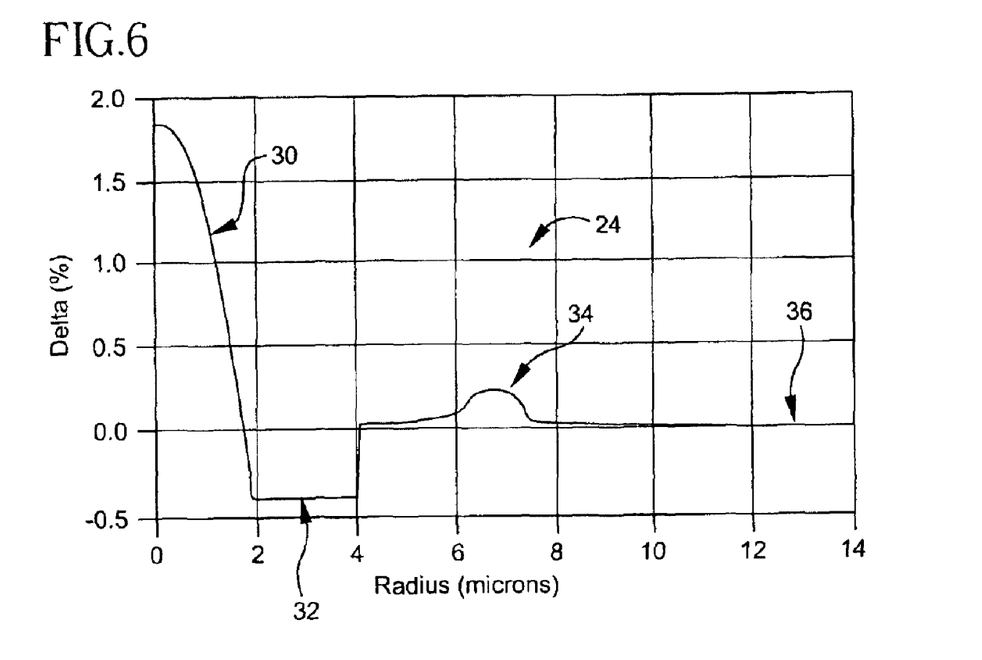

The dispersion compensating fiber 24 in accordance with embodiments of the present invention, has a core refractive index profile as shown in FIGS. 4–6 that results in a fiber exhibiting a negative dispersion slope of less than –0.29 ps/nm$^2$/km and greater than –0.43 ps/nm$^2$/km at a wavelength of 1575 nm, and a negative dispersion of less than –96 ps/nm/km and greater than –108 ps/nm/km at a wavelength of 1575 nm. More preferably, the dispersion slope at 1575 nm is less than –0.32 ps/nm$^2$/km and greater than –0.39 ps/nm$^2$/km. As shown in the embodiment of FIG. 4, the dispersion at 1575 nm is preferably less than –96 and greater than –108 ps/nm/km; and most preferably less than –102 and greater than –108 ps/nm/km at 1575 nm. This dispersion compensating fiber's attributes are ideal for compensating dispersion as well as dispersion slope within a transmission link including a length of SMF operating across the C and L bands (1525 nm to 1625 nm). Most preferably, the dispersion compensating fiber 24 exhibits a kappa value (κ), defined as the Dispersion (D) at 1575 nm divided by the dispersion slope (DS) at 1575 (i.e., a D/DS), of between about 272 and 332 nm. As can be seen in FIG. 3, the fiber 24 also preferably includes an annular cladding layer 36 having a relative refractive index $\Delta c$ that surrounds and abuts the ring segment 34. In particular, the cladding is preferably pure silica and the refractive index profile of the fiber 24 is such that $\Delta 1 > \Delta 3 > \Delta c > \Delta 2$.

Again referring to FIG. 4, the refractive index profile of the dispersion compensating fiber 24 has an up-doped central core segment 30 having peak $\Delta 1$ and an alpha profile having an alpha of between about 1.5 and 5.0. The core segment 30 is surrounded by a down-doped moat segment 32 having peak negative $\Delta 2$, which is, in turn, surrounded by an up-doped annular ring segment 34 having peak $\Delta 3$. All of the aforementioned segments of the physical core are surrounded by the preferably pure silica cladding layer 36 and a protective polymer coating 39 (FIG. 3), such as a urethane acrylate. The coating 39 preferably includes a primary and secondary coating portions of lower and higher modulus, respectively, as is conventional. Preferably, core and ring segments, 30 and 34, are formed using suitable amounts of germania-doped $SiO_2$, although other forms of index refraction increasing dopants could also be employed to achieve the fibers disclosed herein, so long as the same general refractive index profile is achieved. Likewise, whereas moat segment 32 is preferably formed using fluorine-doped $SiO_2$, other index of refraction decreasing dopants could be employed besides fluorine. As mentioned above, the cladding layer 36 is preferably formed of pure silica. However, the cladding region 36 may also include index of refraction increasing or decreasing in dopants, as needed, so long as the relative $\Delta$ versus radius relationship illustrated in FIG. 4 is maintained. The dimension conventions used for defining R1, R2 and R3 and Δ1, Δ2 and Δ3 in FIG. 4 are also equally applicable to FIGS. 5 and 6 herein, although they have not been shown in those figures for clarity purposes.

In all the embodiments of the dispersion compensating fiber 24 illustrated in FIGS. 4–6 herein, Δ1 is preferably greater than 1.7% and less than 2.0% and comprises an outer radius $R_1$ (in FIG. 4, $R_1$ is drawn to the point where the profile intersects the zero delta axis 37) of between about 1.7 and 2.0 microns. Δ2 is preferably less than −0.2% and greater than −0.6%, and the moat segment 32 has an outer radius $R_2$ which ranges between about 3.5 and 4.5 microns. According to the invention, Δ3 of the ring segment 34 is greater than 0.2% and less than 0.5%, and the ring segment has a center radius $R_3$ (as measured from a center of a line interconnecting the half height points of the segment) of between 5 to 8 microns.

Most preferably, the central core segment 30 has an alpha profile shape with an alpha of less than about 5 (and preferably about 1.8), a Δ1 of between about 1.8 and 2.0%, an outer radius $R_1$ between 1.7 to 1.8 microns. The moat segment 32 more preferably has a Δ2 of between about −0.35% and −0.6%, and an outer radius $r_2$ between about 3.3 and 4.1 microns. The annular ring segment 34 preferably exhibits a Δ3 greater than 0.2% and less than 0.4% and a center radius of 5 to 8 microns, and a half-height width of greater than 1.0 micron.

The dispersion compensating fibers made in accordance with the invention preferably exhibit a theoretical (modeled) fiber cut off wavelength (λc) which is less than about 1700 nm. Consequently, the fibers disclosed herein should have an actual cutoff of less than about 1500 nm and are, therefore, desirably single moded in operation from 1525 to 1625 nm.

It should be noted that the fibers disclosed herein do not necessarily have to be employed only in dispersion compensating modules, and instead the fibers could be employed in dispersion compensating fiber cables (rather than enclosed modules—typically box-like enclosures).

In preferred embodiments, the dispersion compensating optical fibers disclosed herein are deployed in such dispersion compensating modules wherein the fiber is wound around a hub of a multi-flanged spool. Preferably the hub is cylindrical, and has a diameter of less than about 12 inches, more preferably less than about 10 inches, and most preferably less than about 6 inches, and the length of fiber deployed therein is typically greater than 1 km. In accordance with an embodiment of the invention, when used in a transmission link, the ratio of the length of the SMF to the length of dispersion compensating fiber is preferably greater than 5:1. In the transmission link shown in FIG. 1, the ratio is between about 5.29:1 and 5.95:1. By way of clarification, there was 100 km of SMF 22 and between about 16.81 and 18.91 km of DCF 24.

EXAMPLES

The invention will be further illustrated by the following examples which are meant to be illustrative of the invention. Examples 1–3 are shown in Table 1, and correspond to the refractive index profiles shown in FIGS. 4–6, respectively.

TABLE 1

| Ex # | Δ1 % | $R_1$ μm | Δ2 % | $R_2$ μm | Δ3 % | $R_3$ μm | D @ 1575 nm | $D_{slope}$ @ 1575 nm | Aeff @ 1575 nm | Pin Array @ 1575 nm | κ @ 1575 nm | cutoff th nm |
|---|---|---|---|---|---|---|---|---|---|---|---|---|
| 1 | 1.84 | 1.80 | −.51 | 4.10 | .34 | 5.6 | −98 | −0.33 | 19.2 | 5.8 | 301 | 1597 |
| 2 | 1.95 | 1.72 | −.50 | 3.52 | .25 | 7.5 | −107 | −0.37 | 18.7 | 4.9 | 293 | 1677 |
| 3 | 1.84 | 1.76 | −.39 | 4.06 | .24 | 6.7 | −106 | −0.35 | 20.6 | 15.4 | 300 | 1634 |

The fibers described in accordance with the invention herein have excellent utility as dispersion compensating fibers for operation in the C+L bands to compensate for the dispersion created in optical communications systems which employ SMF fiber having a zero dispersion wavelength between 1290 and 1320 nm, for example SMF-28® or SMF-28e™ manufactured by Corning Incorporated.

Consequently, in the embodiment of FIG. 1 that is optimized to enable broadband dispersion compensation for SMF across the C+L band, a dispersion compensating fiber such as Example 1 may be employed to compensate for dispersion across the C+L band (1525 to 1625 nm). Such optical communications links 20, as exemplified by FIG. 1, typically consists of, for example, at least a signal component 26, such as a transmitter or amplifier and second component 28, such as a signal receiver or amplifier, and one or more amplifiers or band pass filters that optically interconnect the SMF and DCF (shown collectively as block 27) over the path of communication. Of course, systems including two way communication are contemplated, as well.

Figure 7:
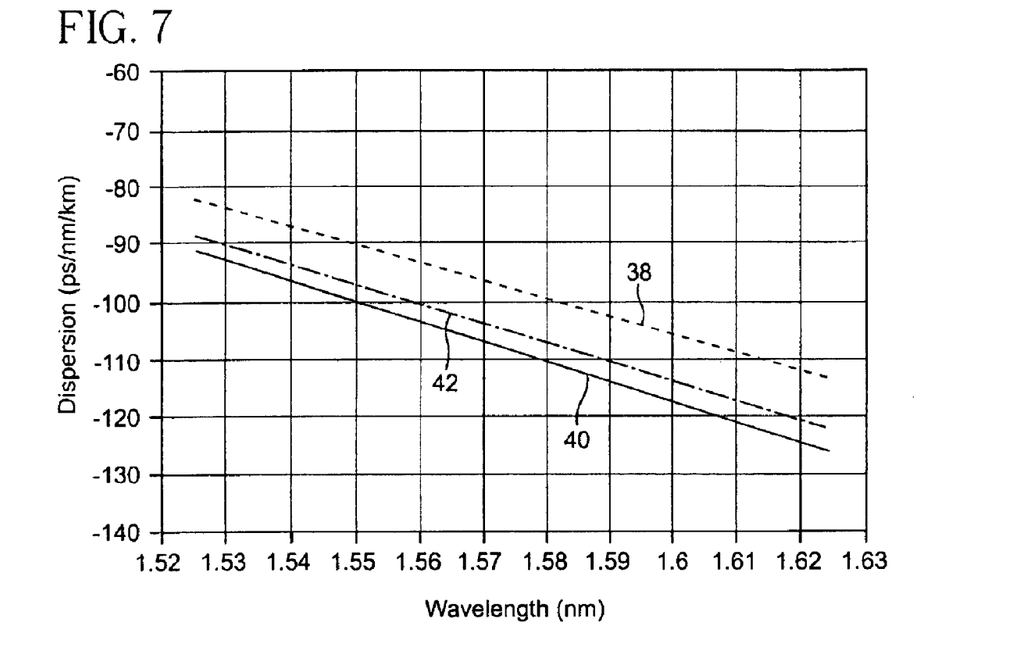
FIG. 7 illustrates a plot of dispersion over the wavelength window of the exemplary embodiments of dispersion compensating fiber in accordance with the present invention.
Figure 8:
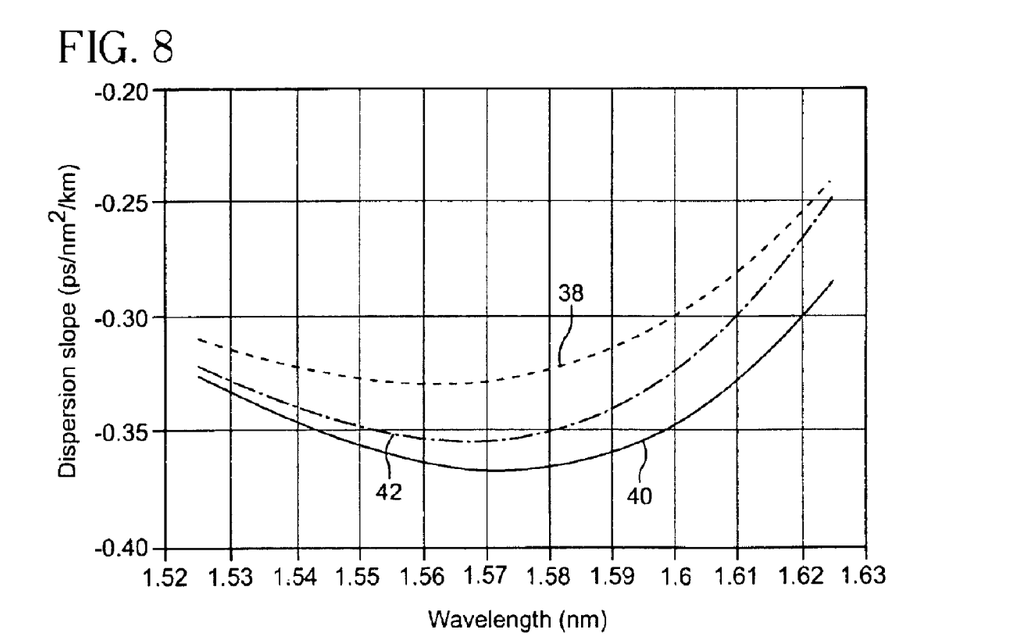
FIG. 8 illustrates a plot of dispersion slope over the wavelength window of the exemplary embodiments of dispersion compensating fiber in accordance with the present invention.
Figure 9:
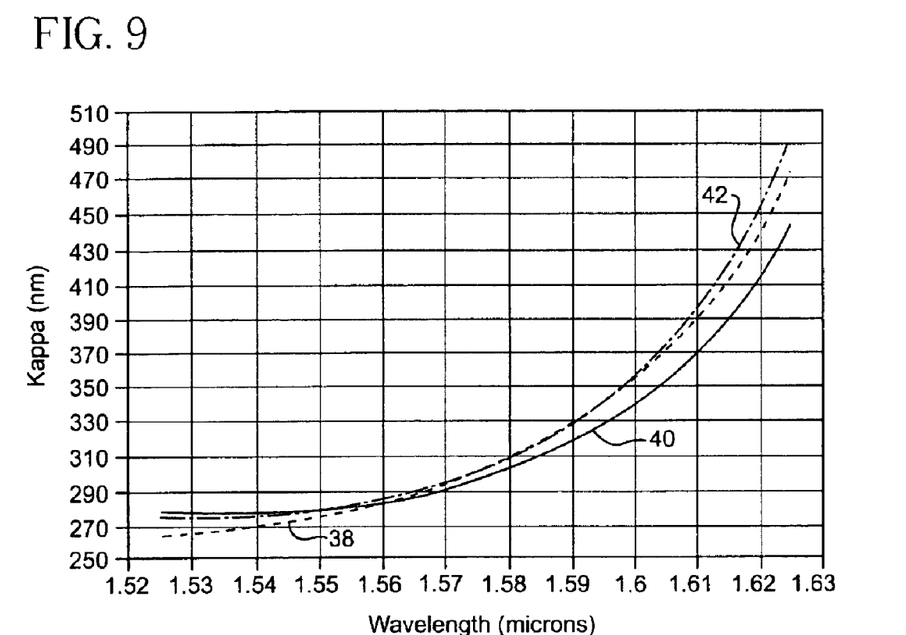
FIG. 9 illustrates a plot of kappa over the wavelength window of the exemplary embodiments of dispersion compensating fiber in accordance with the present invention.

The attributes (dispersion, dispersion slope and kappa) across the desired wavelength band for each of the exemplary embodiments of the invention are shown in FIGS. 7–9, respectively. For example, the first exemplary embodiment (example 1) is designated as 38, the second as 40 and the third as 42. A dispersion plot for the exemplary dispersion compensating fibers over the preferred operating wavelenth range (1525 to 1625 nm) is shown in FIG. 7. Likewise, dispersion slope plots are illustrated in FIG. 8 over the C (1525–1575) and L (1575–1625) bands. FIG. 9 illustrates kappa as a function of wavelength for the exemplary embodiments of DC fibers.

Figure 10:
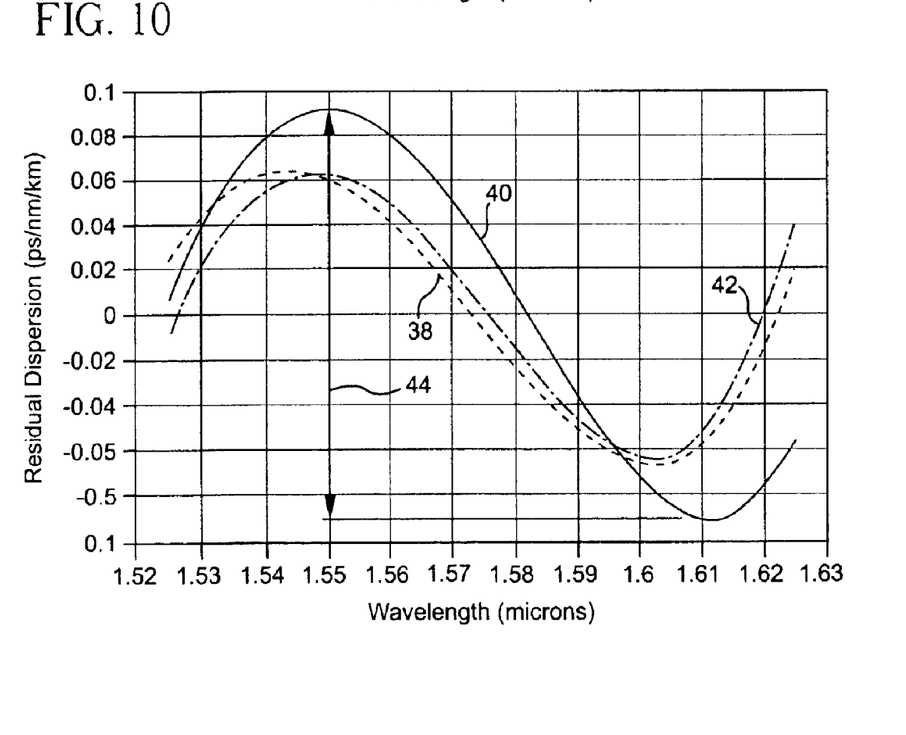
FIG. 10 is a plot illustrating residual dispersion in a transmission link including a combinations of dispersion compensating fiber and SMF in accordance with embodiments of present invention.

FIG. 10 illustrates the high-to-low residual dispersion as a function of wavelength while using the dispersion compensating fibers of Examples 1∝3 in the C+L band. As can be seen the high-to-low value (from the highest point on each plot to the lowest point on the same plot), as designated by 44, of residual dispersion across the C+L band is less than 0.3 ps/nm/km; more preferably less than 0.25 ps/nm/km. The plot illustrates that the dispersion compensating fiber 24 in accordance with the invention nicely compensates for the dispersion of SMF 22 in the link 20 (FIG. 1) over the entire C+L band window.

The dispersion compensating fibers 24 in accordance with embodiments the invention described herein are preferably manufactured utilizing standard OVD methods. The core segment 30 is formed by depositing germania-doped silica soot onto a tapered rotating alumina mandrel. The mandrel is then removed and the soot preform is consolidated in a furnace into a transparent consolidated preform. The consolidated preform is then drawn in a redraw furnace into core cane (slender rod) while simultaneously closing the centerline aperture under a vacuum. A segment of the core cane is placed back into a lathe and further silica soot is deposited thereon by an OVD method. The soot laden core cane is then doped with fluorine in a consolidation furnace introducing $SiF_4$ gas therein sufficient to form the moat. Subsequently, the fluorinated soot preform is fully consolidated thereby forming the fluorine doped moat region in the blank corresponding to moat segment 32. The consolidated blank is again redrawn into a core cane and additional germania-doped soot is applied by OVD thereon to form the region corresponding to the ring segment 34. The soot laden cane is again consolidated an redrawn into a core cane as before mentioned. It should be recognized that this core cane now includes regions corresponding to the core, moat and ring segments. Finally silica soot, corresponding to the cladding 36, is applied onto the core cane by an OVD method and the soot laden cane is again consolidated. This forms the final consolidated preform from which fiber will be drawn. The preform is then transferred to a draw furnace where the dispersion compensating optical fiber is drawn therefrom using conventional techniques.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A dispersion compensating optical fiber, comprising:
a refractive index profile having
a central core segment with a positive relative refractive index $\Delta 1$,
a moat segment surrounding the central core segment having negative relative refractive index $\Delta 2$, and
a ring segment surrounding the moat segment having a positive relative refractive index $\Delta 3$, wherein $\Delta 1 > \Delta 3 > \Delta 2$,
the refractive index profile resulting in
a dispersion slope of less than $-0.29$ ps/nm$^2$/km and greater than $-0.43$ ps/nm$^2$/km at 1575 nm;
a dispersion more negative than $-96$ ps/nm/km and less negative than $-108$ ps/nm/km at 1575 nm,
a kappa value, defined as the dispersion at 1575 nm divided by the dispersion slope at 1575 nm, of between 272 and 332 nm, and
effective area (Aeff) is greater than 18.5 square microns at 1575 nm.

2. The optical fiber of claim 1 further comprising a cladding layer having a relative refractive index $\Delta c$ surrounding the ring segment, wherein $\Delta 1 > \Delta 3 > \Delta c > \Delta 2$.

3. The optical fiber of claim 1 wherein the dispersion slope less than $-0.32$ ps/nm$^2$/km and greater than $-0.39$ ps/nm$^2$/km at 1575 nm.

4. The optical fiber of claim 1 wherein the dispersion is between $-102$ ps/nm/km and $-108$ ps/nm/km at 1575 nm.

5. The optical fiber of claim 1 further comprising a theoretical cutoff wavelength ($\lambda_c$) is less than 1700 nm.

6. The optical fiber of claim 1 wherein $\Delta 1$ is greater than 1.7% and less than 2.0%.

7. The optical fiber of claim 1 wherein $\Delta 2$ is less than $-0.2\%$ and greater than $-0.6\%$.

8. The optical fiber of claim 1 wherein $\Delta 3$ is greater than 0.2% and less than 0.5%.

9. The optical fiber of claim 1 further comprising:
an outer radius $r_1$ of the central core segment is between 1.7 and 2 microns;
an outer radius $r_2$ of the moat segment is between 3.5 and 4.5 microns; and
a center radius $r_3$ of the ring segment is between 5 and 8 microns.

10. The optical fiber of claim 9 wherein
$\Delta 1$ is greater than 1.7% and less than 2.0%,
$\Delta 2$ is less than $-0.2\%$ and greater than $-0.6\%$, and
$\Delta 3$ is greater than 0.2% and less than 0.5%.

11. The optical fiber of claim 1 further comprising a theoretical pin array bend loss less than 25 dB at 1575 nm.

12. An optical fiber transmission link including the dispersion compensating fiber of claim 1, further comprising:
a length of SMF having a zero dispersion wavelength in a wavelength range of between about 1290 nm to 1320 nm and a dispersion between about 13 and 21 ps/nm/km at 1575 nm wherein for a transmission band between 1525 nm to 1625 nm the link exhibits high-to-low residual dispersion less than 0.3 ps/km/nm.

13. The transmission link of claim 12 wherein the length of SMF is greater than 5 times a length of the dispersion compensating fiber.

14. A dispersion compensating optical fiber, comprising:
a refractive index profile having
a central core segment with a positive relative refractive index $\Delta 1$ greater than 1.7% and less than 2.0%,
a moat segment surrounding the central core segment having negative relative refractive index $\Delta 2$ less than $-0.2\%$ and greater than $-0.6\%$,
a ring segment surrounding the moat segment having a positive relative refractive index $\Delta 3$ greater than 0.2% and less than 0.5%, and
a cladding layer having a relative refractive index $\Delta c$ surrounding the ring segment, wherein $\Delta 1 > \Delta 3 > \Delta c > \Delta 2$,
the refractive index profile resulting in
a dispersion slope less than $-0.32$ ps/nm$^2$/km and greater than $-0.39$ ps/nm$^2$/km at 1575 nm;
a dispersion less than $-102$ ps/nm/km and greater than $-108$ ps/nm/km at 1575 nm, and
a kappa value, defined as the dispersion at 1575 nm divided by the dispersion slope at 1575 nm, of between 272 and 332 nm.

15. A dispersion compensating optical fiber, comprising:
a refractive index profile having
a central core segment with a positive relative refractive index $\Delta 1$ greater than 1.7% and less than 2.0% wherein an outer radius $r_1$ of the central core segment is between 1.7 and 2.0 microns,
a moat segment surrounding the central core segment having negative relative refractive index $\Delta 2$ less than $-0.2\%$ and greater than $-0.6\%$ wherein an outer radius $r_2$ of the moat segment is between 3.5 and 4.5 microns,
a ring segment surrounding the moat segment having a positive relative refractive index $\Delta 3$ greater than 0.2% and less than 0.5% wherein a center radius $r_3$ of the ring segment is between 5 and 8 microns, and
a cladding layer having a relative refractive index $\Delta c$ surrounding the ring segment, wherein $\Delta 1 > \Delta 3 > \Delta c > \Delta 2$,
the refractive index profile resulting in
a dispersion slope less than $-0.32$ ps/nm$^2$/km and greater than $-0.39$ ps/nm$^2$/km at 1575 nm;
a dispersion less than $-102$ ps/nm/km and greater than $-108$ ps/nm/km at 1575 nm, and
a kappa value, defined as the dispersion at 1575 nm divided by the dispersion slope at 1575 nm, of between 272 and 332 nm.

* * * * *